(12) United States Patent
Jirskog

(10) Patent No.: US 9,234,784 B2
(45) Date of Patent: Jan. 12, 2016

(54) FREQUENCY MODULATED RADAR LEVEL GAUGING

(71) Applicant: Rosemount Tank Radar AB, Gothenburg (SE)

(72) Inventor: Anders Jirskog, Huskvarna (SE)

(73) Assignee: ROSEMOUNT TANK RADAR AB, Goteborg (SE)

( * ) Notice: Subject to any disclaimer, the term of this patent is extended or adjusted under 35 U.S.C. 154(b) by 285 days.

(21) Appl. No.: 14/063,694

(22) Filed: Oct. 25, 2013

(65) Prior Publication Data

US 2015/0116142 A1   Apr. 30, 2015

(51) Int. Cl.
  G01S 13/08   (2006.01)
  G01F 23/284  (2006.01)
  G01S 13/34   (2006.01)

(52) U.S. Cl.
  CPC ............ *G01F 23/284* (2013.01); *G01S 13/347* (2013.01)

(58) Field of Classification Search
  CPC ............................. G01F 23/284; G01S 13/347
  USPC ................................. 342/124, 127, 103, 175
  See application file for complete search history.

(56) References Cited

U.S. PATENT DOCUMENTS

| | | | |
|---|---|---|---|
| 5,349,358 A | 9/1994 | Canal | |
| 6,040,796 A | 3/2000 | Matsugatani et al. | |
| 7,592,943 B2 | 9/2009 | Beasley | |
| 7,639,177 B2 | 12/2009 | Welle et al. | |
| 8,319,680 B2 | 11/2012 | Sai | |
| 2005/0017895 A1* | 1/2005 | Andersson | G01F 23/284 342/12 |
| 2006/0012512 A1* | 1/2006 | Jirskog | G01F 23/284 342/124 |
| 2007/0247352 A1* | 10/2007 | Michael | G01S 13/34 342/128 |
| 2010/0073222 A1 | 3/2010 | Mitomo et al. | |
| 2011/0181458 A1* | 7/2011 | Feil | G01F 23/284 342/124 |
| 2012/0062297 A1 | 3/2012 | Keaveney et al. | |

(Continued)

FOREIGN PATENT DOCUMENTS

| | | |
|---|---|---|
| GB | 875 315 | 8/1961 |
| WO | WO 2012/089796 | 7/2012 |

OTHER PUBLICATIONS

"Ask the Applications Engineer-30", by A. Fox, Analog Dialogue 36-03 (2002), pp. 1-4.

(Continued)

*Primary Examiner* — John B Sotomayor
(74) *Attorney, Agent, or Firm* — Westman, Champlin & Koehler, P.A.

(57) ABSTRACT

A radar level gauge and a method for measurement of a distance to a surface of a product in a tank are disclosed. The radar level gauge comprises transceiver circuitry configured to transmit and receive electromagnetic signals, the transceiver circuitry comprises a frequency stabilizing feedback loop configured to generate the electromagnetic transmit signal in the form of a frequency sweep. The frequency stabilizing feedback loop is configured to generate an oscillation, forming a sinusoidal modulation of the frequency sweep. The radar level gauge further comprises a second mixer configured to mix an intermediate frequency signal and an integer multiple of the frequency of the sinusoidal modulation to provide an adjusted intermediate frequency signal, and processing circuitry configured to determine the distance based on the adjusted intermediate frequency signal.

By providing a frequency sweep comprising a sinusoidal modulation, an improved sensitivity is achieved by the radar level gauge and method.

22 Claims, 6 Drawing Sheets

(56) References Cited

U.S. PATENT DOCUMENTS

| | | | |
|---|---|---|---|
| 2012/0200453 A1 | 8/2012 | Brosche | |
| 2014/0253147 A1* | 9/2014 | Kleman | G01S 7/35 324/644 |
| 2015/0084808 A1* | 3/2015 | Vacanti | G01S 7/41 342/122 |
| 2015/0097715 A1* | 4/2015 | Schultheiss | G01S 7/4021 342/124 |
| 2015/0116142 A1* | 4/2015 | Jirskog | G01S 13/347 342/124 |
| 2015/0253175 A1* | 9/2015 | Jirskog | G01F 23/284 342/58 |
| 2015/0253176 A1* | 9/2015 | Jirskog | G01F 23/284 342/58 |

OTHER PUBLICATIONS

Notification of Transmittal of the International Search Report and the Written Opinion of the International Searching Authority from PCT/EP2014/072814, dated Feb. 16, 2015.

* cited by examiner

FREQUENCY MODULATED RADAR LEVEL GAUGING

FIELD OF THE INVENTION

The present invention relates to a radar level gauge and method using electromagnetic waves to determine a distance to a surface of a product in a tank.

BACKGROUND OF THE INVENTION

Since radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 9-11 GHz, or 24-27 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. Due to the linear sweep, this difference frequency, also referred to as an intermediate frequency (IF), is proportional to the distance to the reflecting surface. The mixer signal is often referred to as an IF signal.

More recently, the FMCW principle has been improved, and today typically involves transmitting not a continuous sweep but a signal with stepped frequency with practically constant amplitude. When the transmitted and received signals are mixed, each frequency step will provide one constant piece of a piecewise constant IF signal, thus providing one "sample" of the IF signal. In order to determine the frequency of the piecewise constant IF signal, a number of frequencies, N, greater than a number stipulated by the sampling theorem will be required. The distance to the reflecting surface is then determined using the frequency of the IF signal in a similar way as in a conventional FMCW system. Typical values can be 200-300 IF periods at 30 m distance divided in 1000-1500 steps. It is noted that also a continuous IF signal, resulting from a continuous frequency sweep, may be sampled in order to allow digital processing.

Although highly accurate, conventional FMCW systems (continuous as well as stepped) are relatively power hungry, making them less suitable for applications where power is limited. Examples of such applications include field devices powered by a two-wire interface, such as a 4-20 mA loop, and wireless devices powered by an internal power source (e.g. a battery or a solar cell).

One of the reasons for the relatively high power requirement of conventional FMCW systems is the need for isolation between the transmitted and received electromagnetic waves. Isolation may also be improved thus increasing the sensitivity, for example by adding an extra modulation to the frequency sweep. However, such modulation typically requires added components, i.e. an additional oscillator and an adder, and will therefore increase the complexity and power consumption of the device. Hence it would be desirable to improve the sensitivity to decrease the power consumption, without increasing the complexity of the device.

GENERAL DISCLOSURE OF THE INVENTION

With regards to the above-mentioned desired properties of a radar level gauge, it is a general object of the present invention to enable improved performance of a radar level gauge by improving the sensitivity, and to reduce the energy demand of a radar level gauge by enabling a lower emitted power.

The present invention is based upon the realization that by configuring electronic components comprised in a radar level gauge to provide ordinarily undesirable effects, those undesirable effects will actually provide an added modulation, thereby enabling an increased sensitivity for the radar level gauge.

According to a first aspect of the present invention, these and other objects are achieved by a radar level gauge for measurement of a distance to a surface of a product in a tank, the radar level gauge comprising transceiver circuitry configured to transmit an electromagnetic transmit signal and receive an electromagnetic return signal reflected from the surface, the transceiver circuitry comprises a frequency stabilizing feedback loop configured to generate the electromagnetic transmit signal in the form of a frequency sweep, a first mixer configured to mix the transmit signal and the return signal to provide a first intermediate frequency signal, a signal propagation device arranged to guide the transmit signal towards the surface, and to guide the return signal to the transceiver circuitry. The frequency stabilizing feedback loop is intentionally configured to generate an oscillation, forming a modulation of the frequency sweep. The radar level gauge further comprises a second mixer configured to mix the first intermediate frequency signal and an integer multiple of the frequency of the sinusoidal modulation to provide a second intermediate frequency signal and processing circuitry configured to determine the distance based on the second intermediate frequency signal.

According to a second aspect of the invention the objects are also achieved by a method for detecting a distance to a surface of a product kept in a tank. The method comprises generating a frequency sweep in a frequency stabilizing feedback loop intentionally configured to generate an oscillation, thereby forming a modulation of the frequency sweep, transmitting an electromagnetic transmit signal comprising said frequency sweep towards the surface and receiving an electromagnetic return signal comprising the frequency sweep reflected at the surface, mixing the return signal with the transmit signal to provide a first intermediate frequency signal, mixing the first intermediate frequency signal and an integer multiple of the frequency of the modulation to provide a second intermediate frequency signal and determining the distance based on the second intermediate frequency signal.

The modulation formed by the oscillation in the feedback loop enables an improved sensitivity without adding components, and thereby complexity to the radar level gauge. The improved sensitivity is achieved through providing the intermediate frequency signal at a higher frequency than normal. The intermediate frequency signal according to the present invention will comprise the frequency of the sinusoidal modulation and the harmonics of that frequency (i.e. integer multiples of the sinusoidal modulation frequency) plus the ordinary intermediate frequency. The higher frequency of the intermediate signal will suppress the leakage from electronics, waveguides and also decrease the impact of interference caused by objects in close proximity to the signal propagation device. The increased sensitivity may be as much as 10-20 dB.

It should be understood that the second mixing which mixes the first intermediate frequency signal with an integer multiple of the frequency of the sinusoidal modulation, provides the second, adjusted intermediate frequency signal which has a frequency comparable to an intermediate frequency signal in an ordinary FMCW radar level gauge.

The present invention is based on a surprising new use of a frequency stabilizing feedback loop. Conventionally, such a feedback loop is used to ensure a smooth and distinct change of frequency when stepping through a frequency sweep. Any oscillating behavior is accordingly suppressed as far as possible. According to the present invention, however, the frequency stabilizing feedback loop is intentionally configured such that it causes oscillation before adjusting to the new frequency. By ensuring that the duration of this oscillation is comparable to the step time or dwell time of each frequency step, this oscillation can be used to provide an essentially sinusoidal modulation of the frequency. The frequency stabilizing feedback loop could thus be referred to as a "frequency oscillation feedback loop".

The frequency stabilizing feedback loop comprises control parameters which in an ordinary case will be used to set the frequency stepping to become as linear as possible and to contain no oscillation, i.e. have a distinct stepping when the frequency increases. The frequency stabilizing feedback loop bandwidth will affect the size (i.e. the frequency range) of the modulation, which means that a larger bandwidth will allow for larger sinusoidal modulations outside of the usually desired frequency stepping. Furthermore the bandwidth also defines the speed of the control loop i.e. the time before the frequency stabilizing feedback loop achieves a "lock" on a frequency, a smaller allowed bandwidth will increase the time before the frequency stabilizing feedback loop achieves a lock, and vice versa a larger allowed bandwidth will decrease the time before the frequency stabilizing feedback loop achieves a lock. The frequency at which the frequency stabilizing feedback loop samples the input and output signal will determine the frequency of the added sinusoidal modulation.

A relationship between the sampling frequency and the loop bandwidth can be 10 or less, or even as low as 5 or less. This may be accomplished by setting the sampling frequency less than 10 MHz, or even less than 5 MHz. In one example, the sampling frequency of the feedback loop is only 2 MHz. In another example, the sampling frequency of the feedback loop is only 250 kHz.

According to one embodiment of the invention, a relationship between a step time, or step dwell time, for each frequency step of the frequency sweep and the duration of the oscillation is selected such that the modulation is essentially continuous over the frequency sweep. Thereby, a high sensitivity at all portions of the frequency sweep is possible.

Further, by adjusting the step dwell time, and thus the stepping frequency, a modulation frequency lower than the comparison frequency can be generated by configuring the quotient of the comparison frequency and the stepping frequency as a rational number. If the quotient of the comparison frequency and the stepping frequency is an integer, the modulation frequency for the sinusoidal modulation will become equal to the comparison frequency. By configuring the quotient of the comparison frequency and the stepping frequency as a fractional number, the modulation will repeat itself with a frequency equal to the fraction. For example, if the quotient of the comparison frequency and the stepping frequency is six point four, which is six and two fifths, the modulation pattern will repeat itself with a frequency that is one fifth of the comparison frequency. It should be noted that the previous numbers are just examples, and in principle any arbitrary modulation frequency can be generated within the scope of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

This and other aspects of the present invention will now be described in more detail, with reference to the appended drawings showing an embodiment of the invention.

DETAILED DESCRIPTION OF THE PREFERRED EMBODIMENTS

In the present description, embodiments of the present invention are mainly described with reference to a radar level gauge having a free propagating antenna for radiating and capturing an electromagnetic signal. It should be noted that this by no means limits the scope of the invention, which is equally applicable to other signal propagating devices, including other free propagating antennas such as a rod antenna, a patch antenna, a fixed or movable parabolic antenna or a conical antenna, and wave guides, such as a still pipe, a transmission line or a probe, such as a single-line probe (including a so-called Goubau probe), a twin-line probe or a coaxial probe.

Further, in the following description, embodiments of the present invention are mainly described with reference to an FMCW radar level gauge using a stepped frequency sweep. It is noted that the present invention is advantageous in any sampled FMCW, such as a FMCW using a continuous frequency sweep, or even other types of radar systems using frequency sweeps.

Figure 1:
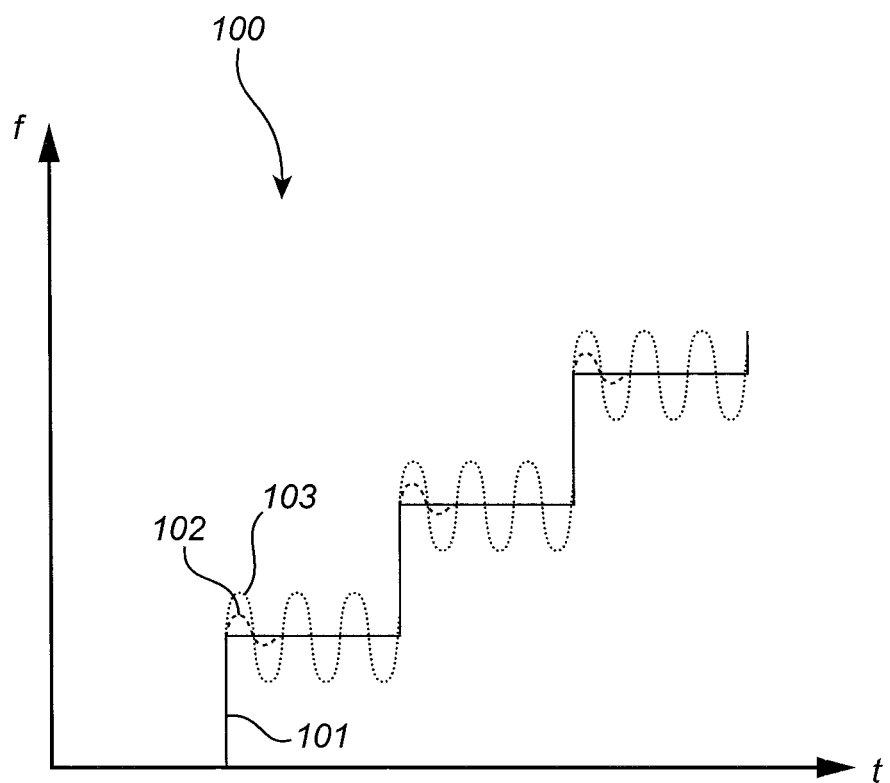
FIG. 1 is a schematic representation of a frequency sweep.

The present invention may be easiest understood by viewing FIG. 1, which schematically illustrates a plot 100 of a frequency sweep, wherein the frequency is plotted against time. The continuous line 101 represents the ideal stepped frequency sweep 101, wherein the frequency sweep is linear and each stepping of the frequency is shown as a distinct step to a higher frequency. The dashed line 102 represents an oscillation, which may be present due to inappropriate setting of the frequency feedback stabilizing loop. The oscillation represented by the dashed line 102 may prolong the time at each frequency step, since the oscillation will register as an error before settling and then allowing the frequency feedback stabilizing loop to stepwise increase the frequency. Hence, time and energy is usually spent to minimize the oscillation represented by the dashed line 102 in order to enable the time at each frequency step to be as short as possible. The dotted line 103 in FIG. 1 represents an oscillation according to the present invention i.e. an added sinusoidal modulation 103. The oscillation which provides the sinusoidal modulation 103 is achieved by configuring the frequency feedback stabilizing loop in a systematic manner.

Note that the amplitude of the sinusoidal modulation 103 and its frequency are mere schematic representations in FIG. 1. As will be further elaborated on later, a typical size of the frequency step is on the order of MHz. The amplitude of the sinusoidal modulation 103 is typically of the order of MHz, and the frequency of the sinusoidal modulation is typically 200-400 kHz or less.

Figure 2:
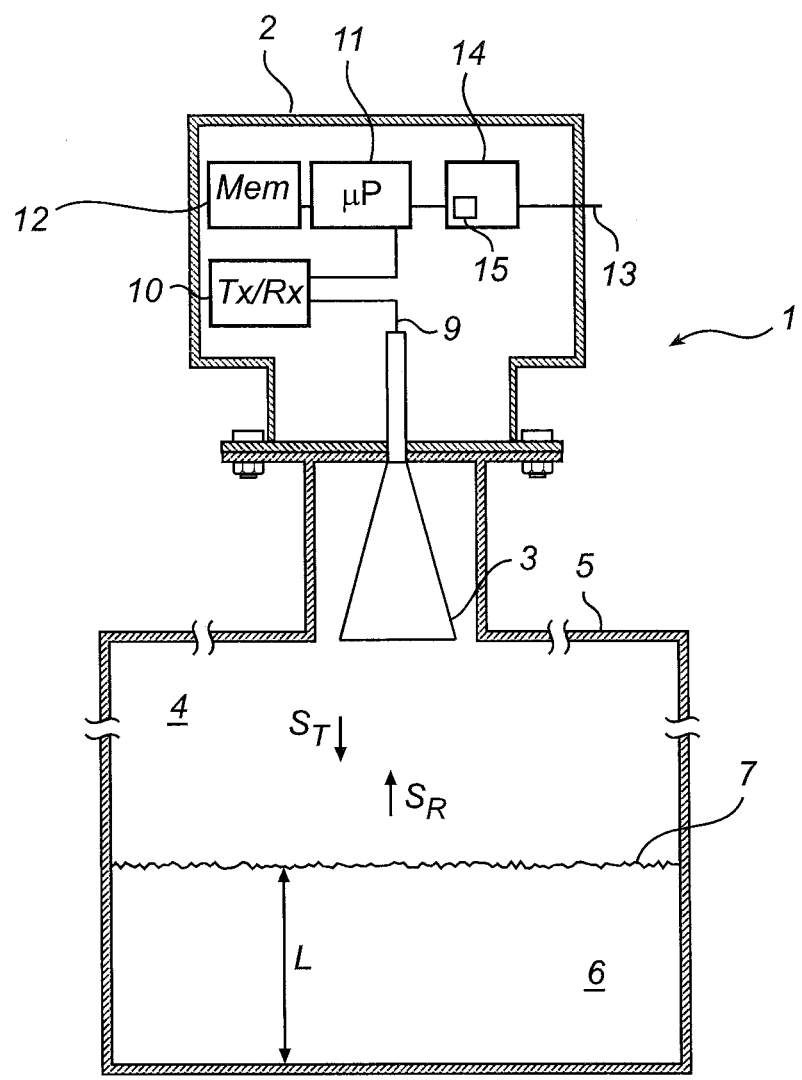
FIG. 2 is a schematic section view of a radar level gauge suitable for implementing the present invention.

FIG. 2 schematically illustrates a radar level gauge 1 according to an embodiment of the present invention, comprising a measurement electronics unit 2, and a signal propagating device, here a horn antenna 3. The radar level gauge 1 is provided on a tank 5, which is partly filled with a product 6 to be gauged. The product 6 in the tank may be a liquid, a liquid gas, or even a solid, such as grain or plastic pellets. The FMCW measurement method provides a relatively high measurement sensitivity of the radar level gauge, enabling reliable measurement results also when interfering objects are present in the tank. By analyzing transmitted signal $S_T$ being radiated by the antenna 3 towards the surface 7 of the product 6, and echo signal $S_R$ traveling back from the surface 7, the measurement electronics unit 2 can determine the distance between a reference position and the surface 7 of the product 6, whereby the filling level L can be deduced. It should be noted that, although a tank 5 containing a single product 6 is discussed herein, the distance to any material interface present in the tank 5 can be measured in a similar manner. Furthermore the transmitted signal $S_T$ being radiated by the antenna 3 towards the surface 7, often comprises a frequency spectrum of 9 to 11 GHz or a frequency spectrum of 24 to 27 GHz.

As is schematically illustrated in FIG. 2, the electronics unit 2 comprises a transceiver 10 for transmitting and receiving electromagnetic signal, which here is connected to the antenna 3 via a wave guide 9. It is noted that the antenna 3 optionally may be connected directly to the transceiver circuitry, or be connected via a suitable signal medium, such as a coaxial cable, The unit 2 further comprises processing circuitry 11, which is connected to the transceiver 10 for control of the transceiver and processing of signal received by the transceiver to determine the filling level of the product 6 in the tank 5. The processing circuitry 11 is also connected to a memory 12, storing any software required for the operation of the radar level gauge 1, and also providing RAM used during operation.

The processing circuitry 11 is further connectable to external communication lines 13 for analog and/or digital communication via an interface 14. As an example, the communication between the communication interface 14 and an external control station (not shown) can be provided by a two-wire interface, which has a combined function of both transmitting the measurement result to the control station and receiving power for operation of the gauge 1. Such a two-wire interface may provide a more or less constant power, and the measurement result can be superimposed on the power voltage using a digital protocol, such as Fieldbus Foundation or HART. Alternatively, the current in the lines is regulated in accordance with the prevailing measurement result. An example of such an interface is the 4-20 mA industrial loop, where the current is regulated between 4 and 20 mA, depending on the measurement result. Alternatively, the radar level gauge 1 may communicate wirelessly with the control station using e.g. a Wireless HART protocol, and use a local power supply (not shown) with batteries or other means of scavenging energy for autonomous operation.

The interface 14 here includes power management circuitry, including a power store 15 for storing power during periods when the microwave unit is inactive, thereby enabling higher power consumption during periods when the microwave unit is active (i.e. during the sweep). With such power management, lower average power consumption may be achieved, while still allowing short periods of higher power consumption. The power store 15 may include a capacitance, and may be restricted by space requirements as well as intrinsic safety requirements (applying when the gauge 1 is arranged in the hazardous zone of a tank with explosive or flammable contents)

Although being shown as separate blocks in FIG. 2, several of the transceiver 10, the processing circuitry 11 and the interface 14 may be provided on the same circuit board, or even in the same circuit.

Figure 3:
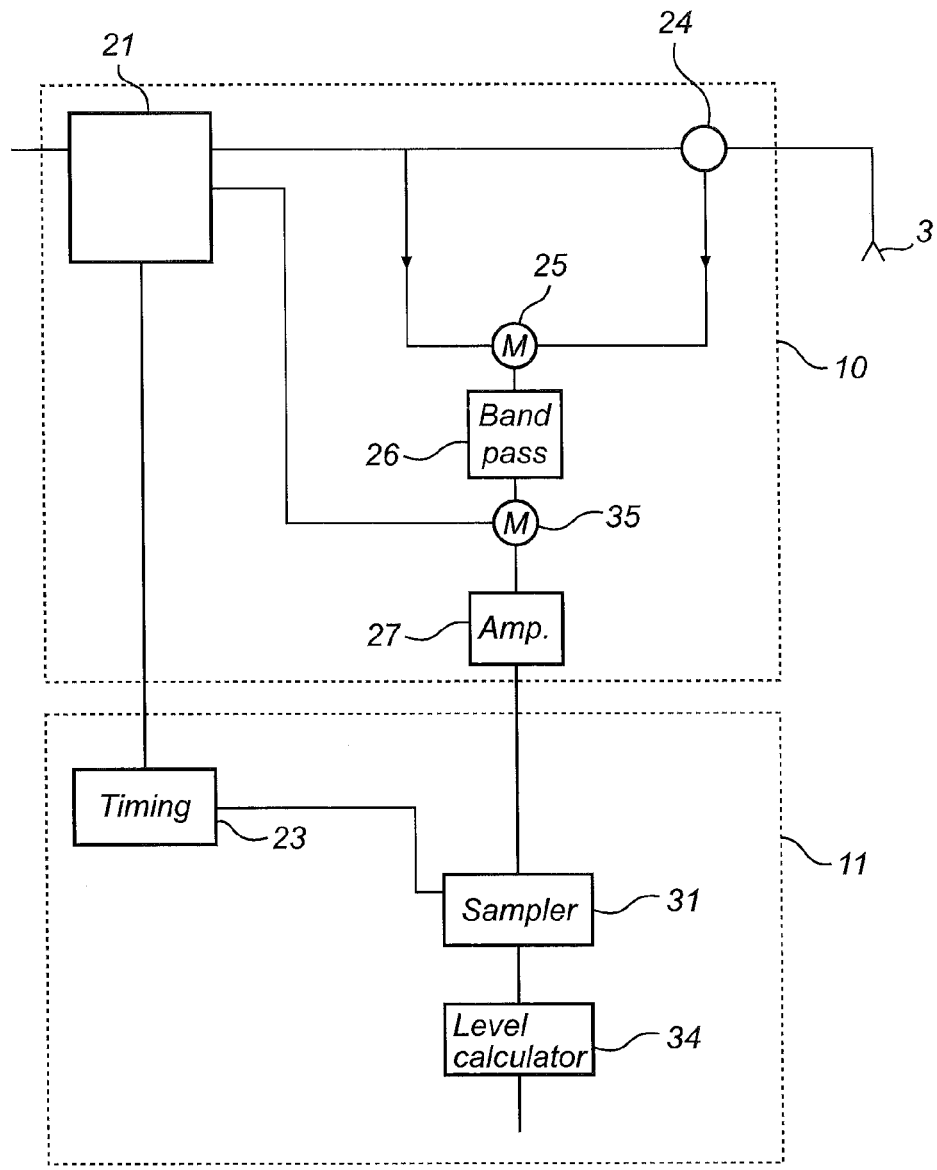
FIG. 3 is a schematic block diagram of a transceiver and processing circuitry in the radar level gauge in FIG. 2, according to an embodiment of the present invention.

Referring now to FIG. 3, there is shown a more detailed block diagram of the transceiver 10 and processing circuitry 11 in FIG. 2 according to an embodiment of the present invention.

The transceiver 10 here includes a microwave source 21, in turn controlled by timing circuitry 23 forming part of the processing circuitry 11. The microwave source 21 is connected to the antenna 3 via a power divider 24, and also to a first mixer 25. The power divider 24 is arranged to connect a return signal from the antenna to the first mixer 25, in order to allow the first mixer 25 to mix the transmitted signal from the microwave source 21 with the return signal and provide the intermediate frequency signal. The first mixer 25 is connected to a band pass filter 26, which in turn is connected to a second mixer 35. The second mixer 35 is also connected to the microwave source 21 in order to receive a signal representing integer multiples of the frequency of the sinusoidal modulation and mix the intermediate frequency signal with the signal from the microwave source 21 to provide the adjusted intermediate frequency signal. The second mixer 35 is further connected to an amplifier 27.

The processing circuitry 11 here includes, in addition to the timing circuitry 23 mentioned above, a sampler 31 adapted to receive and sample the signal from the amplifier 27. The sampler may comprise a sample-and-hold circuit in combination with an A/D-converter, or be realized as a sigma-delta converter. The sampler 31 is controlled by the timing circuitry to be synchronized with the measurement signal. Finally, the processing circuitry includes a level calculator block 34 connected to the sampler 31.

While the elements of the transceiver 10 are typically implemented in hardware, and form part of an integrated unit normally referred to as a microwave unit, at least some portions of the processing circuitry 11 are typically embodied by software modules executed by an embedded processor. The invention is not restricted to this particular realization, and any implementation found suitable to realize the herein described functionality may be contemplated.

Figure 4:
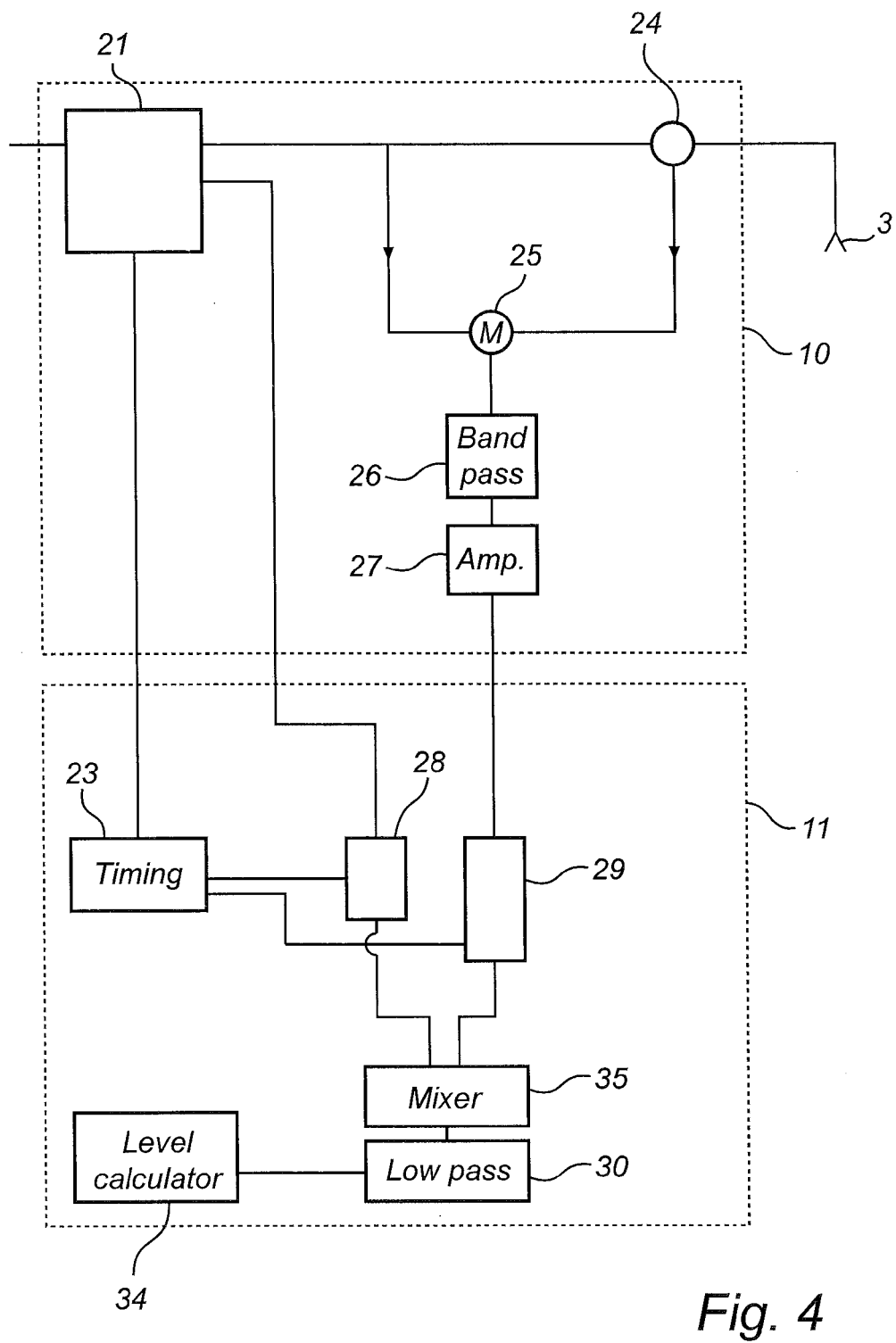
FIG. 4 is an alternative schematic block diagram of a transceiver and processing circuitry in the radar level gauge in FIG. 2, according to an embodiment of the invention.

Referring now to FIG. 4, there is shown a more detailed block diagram of the transceiver 10 and processing circuitry 11 according to another embodiment of the invention. The transceiver of FIG. 4 is similar to the embodiment shown in FIG. 3 until the signal path after the band pass filter 26. The band pass filter 26 of FIG. 4 is directly connected to an amplifier 27.

The processing circuitry 11 here includes, a first sampler 28 which is configured to receive a signal representing the frequency of the sinusoidal modulation from the microwave source 21, and a second sampler 29 which is configured to receive the intermediate frequency signal from the amplifier 27. The first sampler 28 and the second sampler 29 are also configured to receive a timing signal from the timing circuitry 23 in order to synchronize the sampling with the measurement signal. The samplers, as described above, may comprise sample-and-hold circuits in combination with A/D-converters, or be realized as a sigma-delta converters. The sampled signals from the first 28 and the second sampler 29 are fed to a second mixer 35, which is configured to provide the adjusted intermediate frequency signal. The second mixer 35 is connected to a low pass filter 30, which in turn is connected to the level calculator block 34 configured to determine the distance.

It should be understood that several of the components in FIG. 4 which are incorporated in the processing circuitry 11, compared to their respective placement in the embodiment shown in FIG. 3, are partly or wholly embodied as software modules or blocks. For example, the second mixer 35 which is now receiving a sampled signal from the first sampler 28 representing the frequency of the sinusoidal modulation, and a second signal from the second sampler 29 representing the intermediate frequency signal may now mix these digitally. Thus providing the possibility to further amplify or filter the signal through known signal processing algorithms. Further, with sufficient computing power from the processing circuitry it may be enough to sample the signal from the amplifier 27 in the second sampler 29 and provide the adjusted intermediate frequency signal through calculating the frequency of the sinusoidal modulation with signal processing algorithms such as fast Fourier transforms or similar methods.

Figure 5:
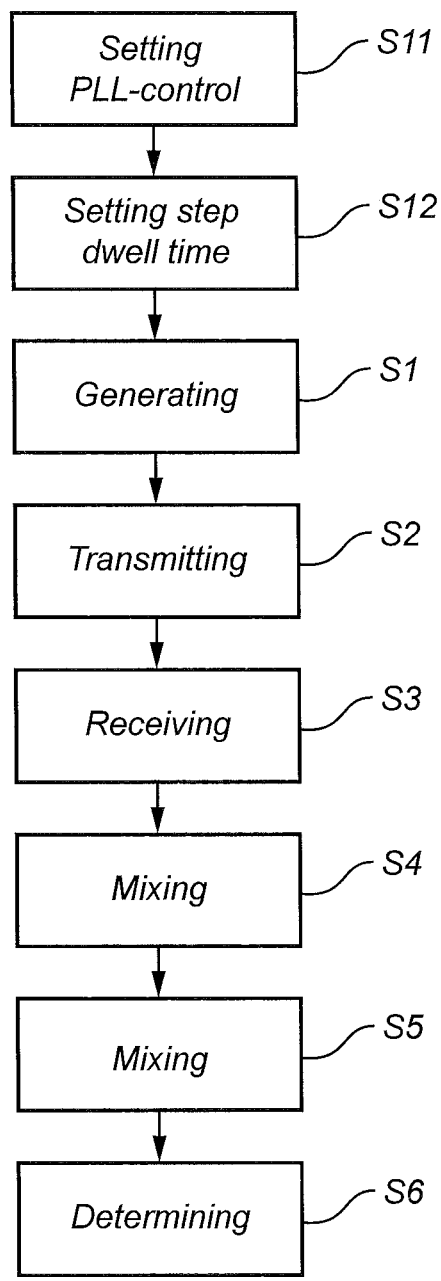
FIG. 5 is a flow chart of the method according to an embodiment of the present invention.

FIG. 5 illustrates a method for providing a measurement of a distance to a surface of a product according to an embodiment of the invention through a flow chart. First, the steps S1-S6 of the method will be described, and later steps S11 and S12 will be described in conjunction with FIG. 6.

First in step S1, the timing circuitry 23 controls the microwave source 21 to output a measurement signal in the form of a stepped frequency sweep. The stepped frequency sweep is generated in the microwave source 21 which comprises a frequency stabilizing feedback loop. The measurement signal can normally be stepped from a lower frequency to a higher frequency in suitable steps. In an alternative embodiment the measurement signal may instead be stepped from a higher to a lower frequency, or the frequency steps may even be taken in any order. As an example, the frequency sweep may have a bandwidth in the order of a few GHz (e.g. 0.2-6 GHz), and an average frequency in the order of 25 GHz or 10 GHz. This number of steps N in the sweep may be in the range 100-4000, typically 200-2000, and may be around 1000 for a desired range of 30 m. The size of each frequency step (Δf) will thus typically be in the order of MHz. For a power limited application the duration of the sweep is limited, and is typically in the order of 0-100 ms. As an example, the duration of the sweep may be around 30 ms, and with 1000 frequency steps (N=1000), this results in a duration for each step in the order to 30 μs, or an update rate of around 30 kHz. The frequency feedback stabilizing loop is configured to generate an oscillation forming a sinusoidal modulation of the stepped frequency sweep.

Secondly, in step S2, the measurement signal from the microwave source 21 is emitted into the tank 5 as an electromagnetic transmit signal $S_T$ by the antenna 3 towards the surface 7.

Then, in step S3, a return signal $S_R$ traveling back from the surface 7 after being reflected, is received by the antenna 3 and sent along the waveguide 9 to the transceiver 10 and thus the power divider 24. In step S4 the return signal $S_R$ is sent via the power divider 24 to the first mixer 25 and is mixed with the measurement signal to provide an intermediate frequency signal. Ordinarily the intermediate frequency signal is a piecewise constant oscillating signal, with a frequency proportional to the distance to the reflecting surface and the piecewise constant length is the same length as the measurement signals step length. A typical frequency is in the order of kHz, e.g. less than 100 kHz, and typically less than 15 kHz. An intermediate frequency signal according to the present invention however, will have a higher frequency which is proportional to the intermediate signal plus multiples of the sinusoidal modulation frequency, thereby requiring a second step of mixing to demodulate the intermediate frequency signal. The integer multiples of the sinusoidal modulation frequency are created as the harmonics of the sinusoidal modulation frequency as a result from the Bessel functions involved. It should be noted that the energy transmitted in the electromagnetic transmit signal $S_T$ will be divided among these harmonics, the increase in sensitivity however will more than make up for the transmitted energy being divided.

Hence, in step S5, the intermediate frequency signal from the first mixer 25, having passed the band pass filter 26 which has been set allow intermediate frequency signals of a certain frequency corresponding to at least one of the integer multiples of the sinusoidal modulation frequency, is mixed with an integer multiple of the frequency of the sinusoidal modulation by the second mixer 35 to provide an adjusted intermediate frequency. Therefore, the integer multiple which corresponds to the same frequency configured for the band pass filter 27 is preferably used in order to demodulate and provide the adjusted intermediate frequency signal. This adjusted intermediate frequency signal comprises a frequency proportional to the distance to the reflecting surface, and is in the order of kHz, e.g. less than 100 kHz, and usually less than 15 kHz.

As an alternative, the second mixer 35 may be embodied in the processing circuitry as software, wherein the return signal $S_R$ is mixed with the measurement signal in the first mixer 25 and the intermediate frequency signal is sampled in the processing circuitry 11 before being mixed in the second mixer 35 to provide the adjusted intermediate frequency signal in the processing circuitry. Moreover, if the second mixer 35 is implemented as software the frequency of the sinusoidal modulation from the microwave source 21 to the second mixer 35 may not be needed. By providing the second mixer 35 as software, unused processing ability available in the processing circuitry 11 may be used to provide the demodulation of the intermediate signal into an adjusted intermediate signal, the information inherently known in the processing circuitry 11 of the timing signal from the timing circuitry 23 will be used in order to demodulate the intermediate frequency signal without adding extra components to the system.

Then, in step S6, the amplified adjusted intermediate frequency signal is received by the processing circuitry 11, where it is sampled and A/D-converted by the sampler 31. The sampling frequency of the A/D-converter 30 is advantageously sufficiently close to the update rate of the measurement signal, in order to sample each step of the measurement signal once and only once.

The sample vector resulting from the sampling is supplied to the level calculator block 34, which determines the frequency of the adjusted intermediate frequency signal based on the sample vector, and then determines the distance to the reflecting surface (and subsequently the filling level of the product in the tank) based on the frequency of the adjusted intermediate frequency signal.

Figure 6:
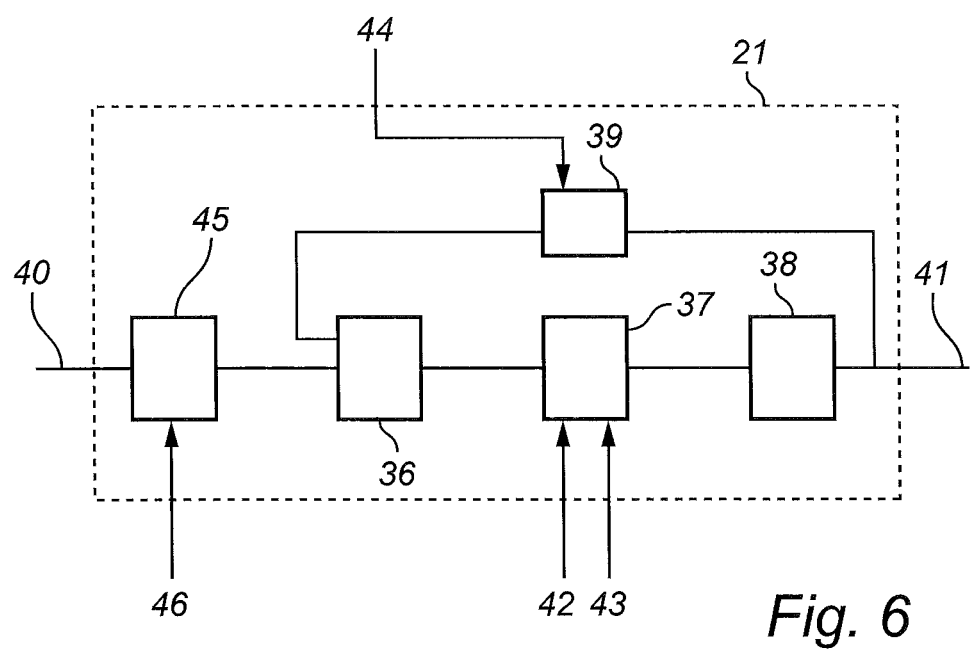
FIG. 6 is a schematic block diagram of a microwave source comprising a phase frequency stabilizing loop in the transceiver in FIG. 2.

In FIG. 6 the microwave source 21 is illustrated in more detail. The microwave source 21 comprises a phase frequency detector 36, a loop filter 37, a voltage controlled oscillator 38, a feedback frequency divider 39 and a frequency divider 45.

The microwave source 21 will, in use, receive a signal 40 from the timing circuit which comprises a timing frequency. The timing frequency may be divided by the frequency divider 45 before being detected by the phase frequency detector 36. The phase frequency detector will detect and compare the frequency of the signal 40 from the frequency divider 45 with the signal produced by the voltage controlled oscillator 38 which is divided by the feedback frequency divider 39, and produce an error signal proportional to the difference between the phases of the signal 40 from the frequency divider 45 and the signal from the feedback frequency divider 39. The error signal is then filtered in the loop filter 37 and used to drive the voltage controlled oscillator 38 which will create an output signal 41 comprising an output frequency. The output signal 41 will be returned to the phase frequency detector 36 through the frequency divider 39, thereby creating a negative feedback loop, hence if the output signals 41 frequency would drift the error signal would increase and drive it back toward the correct value. By means of the feedback loop 36, 37, 38, and 39 the output signal 41 from the microwave source 21 is "locked" to the input signal 40 from the timing circuit 23. It is noted that the output frequency usually is not equal to the input signal frequency. The frequency divider 39 will divide the output signal by an integer N or a fractional value, and hence the output frequency may be stepped in integer multiples (or any rational number by the fractional division) of the input signal 40 to provide a stepped frequency sweep as an output signal 41 from the microwave source 21.

Accordingly there are also parameters which may be set for the frequency stabilizing feedback loop shown in FIG. 6. One parameter is the feedback loop bandwidth 42, which should be understood as setting the loop filter 37 bandwidth. Another parameter for the frequency stabilizing feedback loop is the comparison frequency, which is the frequency of the input signal 40 from the timing circuit 23. The comparison frequency will determine the sampling frequency of the phase frequency detector 36. In FIG. 6 a frequency divider 45 is shown which is able to divide the frequency of the input signal 40 from the timing circuit 23, hence by controlling the integer or fractional division by the frequency divider signal 46 the comparison frequency is controlled. Furthermore the phase margin 43 of the loop filter 37 may be set to determine the stability of the feedback loop. Another parameter which is also set in the microwave source 21 is the step dwell time 44 i.e. the amount of time before the integer multiple of the frequency divider is increased and thus a stepping of the output signal 41 frequency is achieved.

The feedback loop bandwidth 42 will control the size of the error signal produced by the phase frequency detector 36, and as a result also control the speed of the control loop, due to the fact that a larger allowed error signal (i.e. a larger bandwidth) will result in less time before the output signals 41 frequency may settle to the intended frequency. Ordinarily a high sampling frequency is required to ensure that the stepping of the stepped frequency sweep is distinct and that the oscillation is as short as possible. However, by setting the comparison frequency lower by controlling the frequency divider 45 or the input signal frequency from the timing circuit 23, such that the phase frequency detector 36 samples slower than desirable for a distinct and smooth stepping of frequencies, an oscillation will occur in the frequency sweep. This oscillation may be understood as a phase frequency discrete sampling effect. Moreover if the previously mentioned comparison frequency is as low as ten times the feedback loop bandwidth 42, the larger time required for the output signal 41 frequency to settle to an intended frequency together with the relatively low sampling frequency will produce oscillation i.e. phase frequency discrete sampling effects.

The step dwell time 44 is the amount of time spent at each step in the stepped frequency sweep before the frequency divider 39 increases the integer N to N+1 (or any fractional value), which means that the frequency stabilizing feedback loop will try to acquire a "lock" on the next step in the stepped frequency sweep. By setting the step dwell time, a continuous oscillation may be provided in order to form a sinusoidal modulation of the frequency sweep which is continuous. Moreover the phase margin 43 may be set to produce phase frequency discrete sampling effects or produce them in combination with the frequency stabilizing feedback loop bandwidth and comparison frequency.

Now referring to FIG. 5 again, step S11 comprises setting at least one of feedback loop bandwidth 42, comparison frequency, or the phase margin 43 in order to cause an oscillation when settling to a new frequency.

As an example, the comparison frequency is set to 2 MHz, and the loop bandwidth 42 is set to 200 kHz. The phase margin is set to 35 to 70 degrees, e.g. 50 degrees. Other values may also be adequate, but it is typically important that the comparison frequency (i.e. the sampling frequency of the loop) is not too much greater than the bandwidth. In a conventional frequency stabilizing feedback loop the relationship can be in the order of 100. Here, the relationship should typically not be more than a factor 10 or even less. According to some embodiments a comparison frequency in the range around 200 kHz is used.

Secondly step S12, comprises setting the step dwell time 44 to provide a continuous oscillation and thus a continuous sinusoidal modulation. Further, as mentioned earlier, the step dwell time 44 together with the comparison frequency may be used to control the frequency of the sinusoidal modulation in order to produce a sinusoidal modulation at, in principle, any frequency.

Thus, step S11 and S12 may be performed only once the radar level gauge is installed, or as often as is needed such as once a month or even prior to every frequency sweep if required.

The frequency stabilizing feedback loop of FIG. 6 may be wholly or partly incorporated by a phase locked loop (PLL). Phase locked loops are commercially available in many format such as analog or digital, with integer or fractional frequency dividers 45. Furthermore, a commercial PLL may comprise a charge pump and/or a frequency divider 45. The comparison frequency divider will enable an easy control of the comparison frequency by dividing the comparison frequency of an input signal before entering the feedback loop. Moreover, the frequency of the oscillation, i.e. the modulation frequency, is often available on an output pin of a commercial PLL which may advantageously be used to connect the microwave source 21 and the second mixer 35.

Although the figures may show a specific order of method steps, the order of the steps may differ from what is depicted. Also two or more steps may be performed concurrently or with partial concurrence. Such variation will depend on the software and hardware chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A radar level gauge for determine a distance to a surface of a product in a tank, said radar level gauge comprising:
    transceiver circuitry configured to transmit an electromagnetic transmit signal and receive an electromagnetic return signal reflected from said surface, said transceiver circuitry comprising a frequency stabilizing feedback loop configured to generate said electromagnetic transmit signal in the form of a frequency sweep, wherein said frequency stabilizing feedback loop is intentionally configured to generate an oscillation, causing a modulation of said frequency sweep,
    a signal propagation device arranged to guide said transmit signal towards said surface, and to guide said return signal to said transceiver circuitry,
    a first mixer configured to mix said transmit signal and said return signal to provide a first intermediate frequency signal,
    a second mixer configured to mix said intermediate frequency signal with a signal having a frequency which is an integer multiple of the frequency of said modulation to provide a second intermediate frequency signal, and
    processing circuitry configured to determine said distance based on said second intermediate frequency signal.

2. The radar level gauge according to claim 1, wherein said frequency stabilizing feedback loop has a loop bandwidth and a sampling frequency, and wherein said oscillation is caused by setting at least one of said loop bandwidth, and said sampling frequency.

3. The radar level gauge according to claim 2, wherein said frequency stabilizing feedback loop comprises a phase frequency detector, said sampling frequency being a comparison frequency of said phase frequency detector.

4. The radar level gauge according to claim 2, wherein a relationship between said sampling frequency and said loop bandwidth is 10 or less.

5. The radar level gauge according to claim 2, wherein a relationship between said sampling frequency and said loop bandwidth is 5 or less.

6. The radar level gauge according to claim 2, wherein said sampling frequency is less than 10 MHz.

7. The radar level gauge according to claim 2, wherein said sampling frequency is less than 5 MHz.

8. The radar level gauge according to claim 1, wherein a relationship between a duration of said oscillation and a step time for each frequency in said frequency sweep is such that said modulation is essentially continuous over said frequency sweep.

9. The radar level gauge according to claim 1, wherein said frequency stabilizing feedback loop is realized by a phase lock loop (PLL).

10. The radar level gauge according to claim 1, wherein said modulation is essentially sinusoidal.

11. The radar level gauge according to claim 1, wherein said frequency sweep extends from 9 GHz to 11 GHz.

12. The radar level gauge according to claim 1, wherein said frequency sweep extends from 25 GHz to 27 GHz.

13. A method for detecting a distance to a surface of a product kept in a tank, said method comprising;
    generating a frequency sweep in a frequency stabilizing feedback loop intentionally configured to generate an oscillation, thereby causing a modulation of said frequency sweep,
    transmitting an electromagnetic transmit signal comprising said frequency sweep towards said surface,
    receiving an electromagnetic return signal comprising said frequency sweep reflected at said surface,
    mixing said return signal with said transmit signal to provide a first intermediate frequency signal,
    mixing said first intermediate frequency signal and an integer multiple of the frequency of said modulation to provide a second intermediate frequency signal, and
    determining said distance, based on said second intermediate frequency signal.

14. The method according to claim 13, wherein said frequency stabilizing feedback loop has a loop bandwidth and a sampling frequency, and wherein said step of generating said frequency sweep further comprises setting at least one of said loop bandwidth and said sampling frequency.

15. The method according to claim 13, wherein a relationship between said sampling frequency and said loop bandwidth is 10 or less.

16. The method according to claim 13, wherein a relationship between said sampling frequency and said loop bandwidth is 5 or less.

17. The method according to claim 13, wherein said sampling frequency is less than 10 MHz.

18. The method according to claim 13, wherein said sampling frequency is less than 5 MHz.

19. The method according to claim 13, wherein a relationship between a duration of said oscillation and a step time for each frequency in said frequency sweep is such that said modulation is essentially continuous over said frequency sweep.

20. The method according to claim 13, wherein said modulation is essentially sinusoidal.

21. The method according to claim 13, wherein said frequency sweep extends from 9 GHz to 11 GHz.

22. The method according to claim 13, wherein said frequency sweep extends from 25 GHz to 27 GHz.

* * * * *